Feb. 9, 1926.

H. C. HACHMUTH

MOTOR VEHICLE SIGNAL

Filed Feb. 26, 1923

Inventor
Henry C. Hachmuth
By Frank E. Liverance, Jr.
Attorney.

Feb. 9, 1926.

H. C. HACHMUTH 1,572,138

MOTOR VEHICLE SIGNAL

Filed Feb. 26, 1923

Inventor
Henry C. Hachmuth
By Frank E. Liverance, Jr.
Attorney

Patented Feb. 9, 1926.

1,572,138

UNITED STATES PATENT OFFICE.

HENRY C. HACHMUTH, OF COMSTOCK PARK, MICHIGAN.

MOTOR-VEHICLE SIGNAL.

Application filed February 26, 1923. Serial No. 621,278.

*To all whom it may concern:*

Be it known that I, HENRY C. HACHMUTH, a citizen of the United States of America, residing at Comstock Park, in the county of Kent and State of Michigan, have invented certain new and useful Improvements in Motor-Vehicle Signals; and I do hereby declare the following to be a full, clear, and exact description of the invention, such as will enable others skilled in the art to which it appertains to make and use the same.

This invention relates to a signal for motor vehicles adapted to be used to indicate contemplated changes in direction or stopping or slowing of the vehicle in conformity to the standard code of signals used when the hand and arm of the driver of the vehicle is used to indicate the signal to the other drivers on the road. The signal which I have devised is simple in construction, very easily applied to motor vehicles having either open or closed bodies, and is readily operated manually to the different positions for the different signal indications, being lighted at all positions except the one forward driving position so that the signal is readily discerned at night. It is a primary object and purpose of the invention to make a signal having the above characteristics, together with many others not at this time specifically stated but which will appear as understanding of the invention is had from the following description, taken in connection with the accompanying drawings, in which, Fig. 1 is a plan view of the signal, shown in full lines in the forward driving position and in dotted lines in other positions, and attached to the horizontal upper bow of the top of the vehicle.

Like reference characters refer to like parts in the different figures of the drawings.

Figure 6:
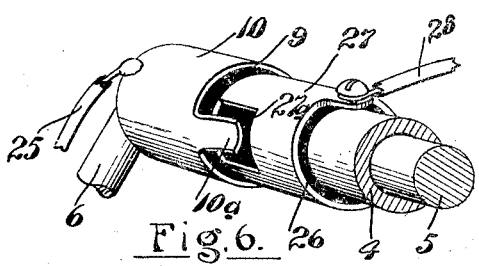
Fig. 6 is a fragmentary perspective view of the switch used with the signal.

In the construction of the signal, a clamping member 1 with which a clamping band or staple 2 is associated is used for mounting on a bow 3 of the top of an open body of motor vehicle, said bow being the front horizontal bow of the top. An extension $1^a$ to the member 1 extends downwardly through which a sleeve 4 passes and is permanently secured, a rod or shaft 5 being rotatably mounted in and passing through the sleeve, extending outwardly a distance beyond the end of the sleeve and then being turned at an angle, as indicated at 6, to the end of which portion 6, a disk 7 is permanently attached. On the shaft 5 a shorter sleeve 8 is fixed in alinement with the sleeve 4 and over said sleeve 8 a covering cylinder 9 of insulation is placed, it in turn being covered with a relatively thin metal sleeve 10, at one end and at one side having a contact lip $10^a$ projecting therefrom, as best shown in Fig. 6.

Over the sleeve 10 a cylinder 11 of metal is placed to which at its outer end a second longer cylinder 12 of sheet metal is secured and located at an angle to the part 11. The disk 7 substantially fills the cross section of the member 12 and screws 13 pass through the said member into the disk to permanently connect it to the disk. A short distance beyond disk 7, a number of openings 14 are made at spaced apart distances in the sides of the member 12, and a tube of colored glass or other transparent material is secured within the said member 12, passing over and closing the openings 14. The glass will, preferably, be green in color, though any preferred color may be used. At the outer end of the member 12 a second short length 16 of glass, preferably red in color, is located and extends beyond the end of the member. A cap 17 is used to close the end of the tube and hold it against outward movement, legs or vanes 18 passing around the cap and extending to the member 12 to which they are permanently connected.

A number of bars or rods 19 are positioned lengthwise of and within the member 12, at one end bearing against the disk 7 and at the other end having the end of the tube 16 bearing thereagainst. To these bars and between them light sockets 20 and 21 are permanently secured, the same being designed to carry electric light bulbs 22 and 23 which are positioned so as to give their light through the tube 16 and the openings at 14 through tube 15. The bars 19 are permanently connected to the disk 7 so that on removal of the screws 13, the outer casing member 12 may be drawn in a lengthwise direction from over the bulbs, their sockets, and the frame comprised of bars 19 which supports the same, permitting replacement of the bulbs whenever the same are burned out or otherwise useless.

A metal rod 24 connects the sockets 20 and 21. A wire 25 is connected at one end to the rod 24 and at the other end to the sleeve 10. A sleeve 26 of insulation material is located around the sleeve 4 adjacent its inner end and over said sleeve 26 a sheet metal sleeve 27 is secured, at the end adjacent the sleeve 10 having a notch 27ª cut therein into which the finger 10ª enters in one position of the signal. A wire 28 is connected to the sleeve 27 and leads therefrom to one pole of a battery 29, serving as a source of electric energy. Another wire 30 leads from the other pole of the battery to the extension 1ª of the clamp member 1, as a ground. On the end of the rod or shaft 5 an operating handle 31 is fixed for manual operation of the signal.

Figures 1, 2, 3:
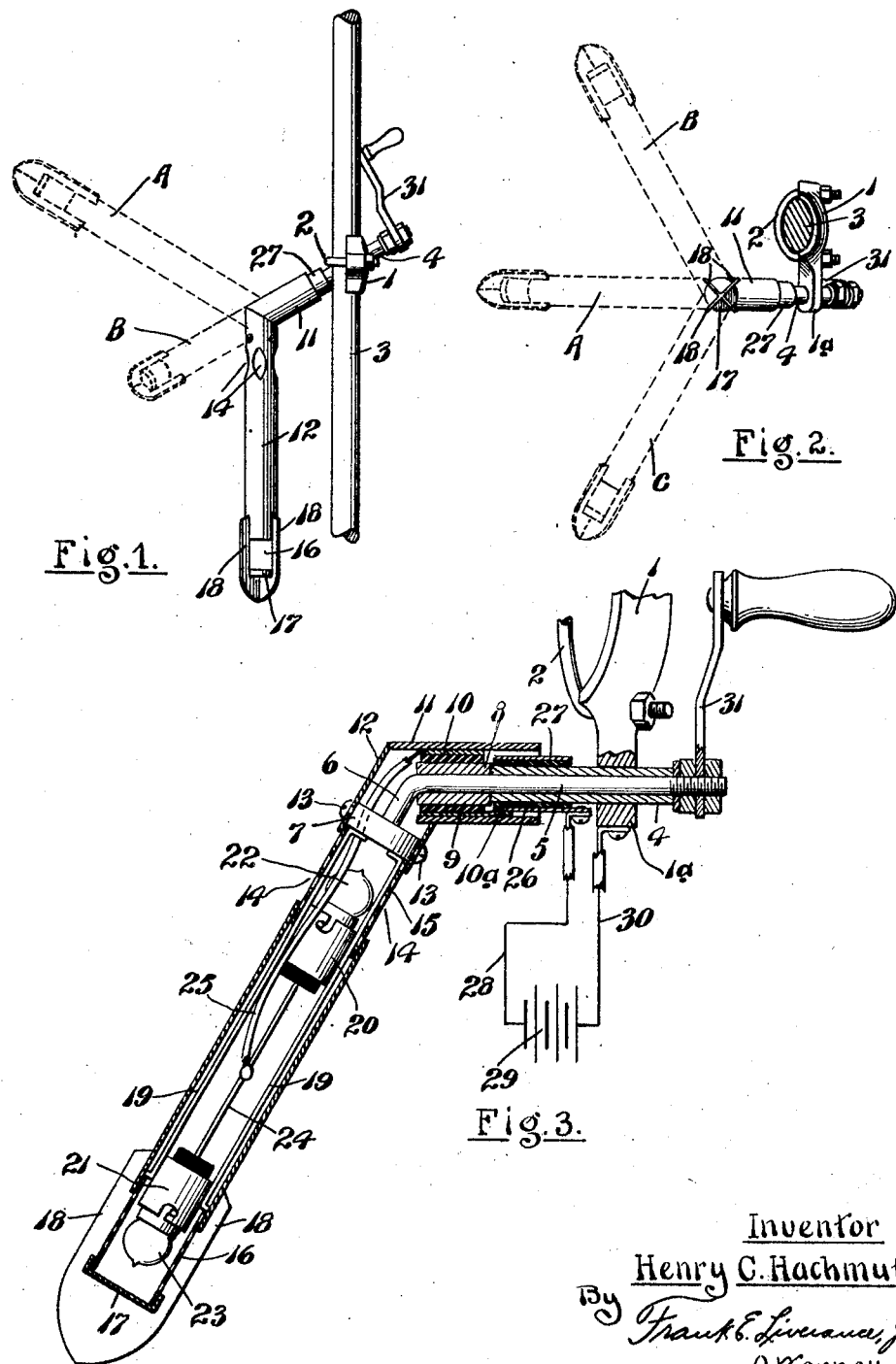
Fig. 2 is a rear elevation of the signal, the bow being shown in cross section.
Fig. 3 is an enlarged central section longitudinally through the signal.

In installing the signal on the bow 3, the sleeve 4 is disposed at such an angle to the bow that the outer member or arm 12 of the signal lies parallel to the bow with its free end extending to the rear in one position, this being the forward straight driving position. When in such position, the finger 10ª is in the recess 27ª and the circuit is broken so that the lights 22 and 23 do not light. All that appears from behind is the end of the arm 12, that is the cap 17 thereon and the vanes 18, as shown in Fig. 2. When turned through an angle of one hundred and eighty degrees, the arm 12 takes the position indicated in dotted lines at A, appearing to one behind to extend straight out, as shown in Fig. 2, this being a signal for a left turn. The arm may also be turned to a position like that indicated in dotted lines at B, wherein a right turn is signalled, or to another position like that shown in dotted lines at C, a slowing or stopping of the vehicle being signalled. All of these positions are easily attained by turning the handle or crank 31. As soon as turned from the horizontal rearwardly extended position shown in full lines, the finger 10ª comes into contact engagement with the sleeve 27, the circuit being completed and the lights lighted, the same indicating at night the position of the signal arm, as is obvious. The operating handle 31 may be made heavy to partly or wholly balance the weight of the signal arm and prevent its movement from positions to which moved, in connection with the friction resisting turning.

Figure 4:
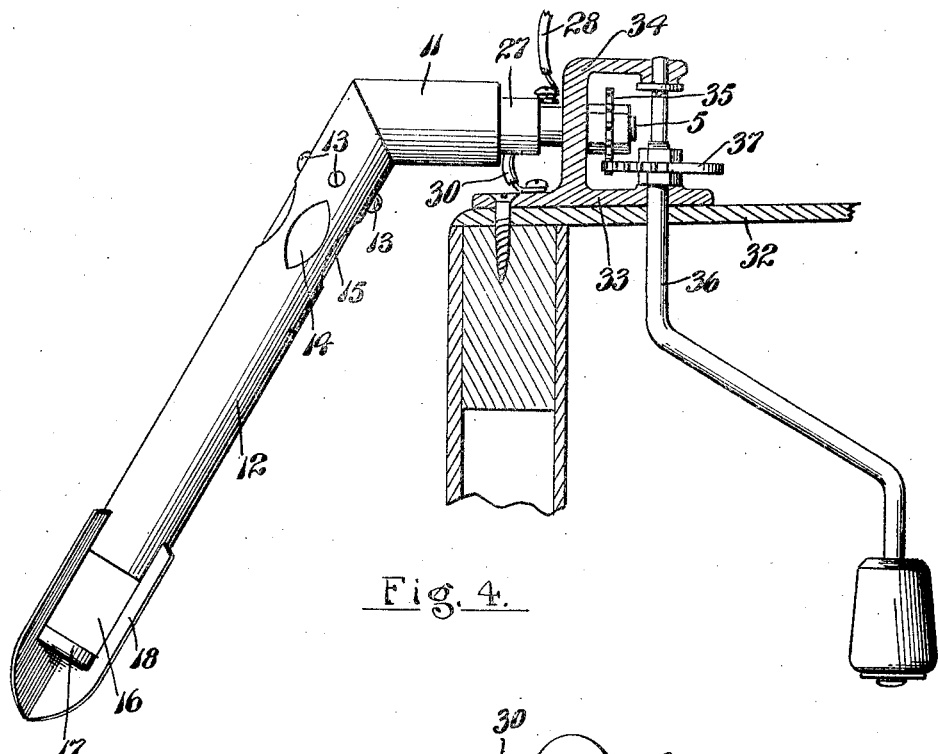
Fig. 4 is a rear elevation of the signal in its slow or stop signalling position and attached to a closed body, fragmentary parts of which and the mounting for the signal are shown in section.
Figure 5:
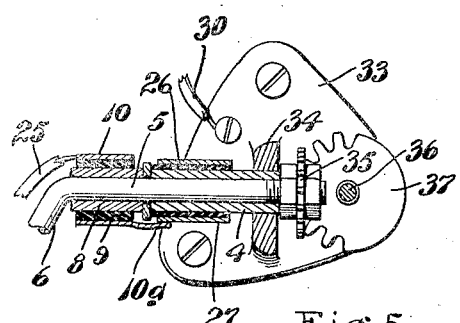
Fig. 5 is a horizontal section through the mount for the signal and adjacent portions of the signal.

In Figs. 4 and 5, the construction is adapted to be applied to closed bodies, being attached to the top 32 of a body, a bracket 33 having an overhanging portion 34 in the vertical arm of which the sleeve 4 is mounted. The shaft 5 at its end has a pinion 35 secured thereto. A crank 36 passes upwardly through the top 32, the base of the bracket 33 and at its upper end is rotatably mounted in the overhanging portion 34, and a disk 37 is fixed on the crank, at one side having a series of teeth cut therein to mesh with the pinion 35. The signal construction otherwise is the same as that shown in Fig. 3, and the difference in mounting is for the purpose of permitting the operation of the signal in the closed body by means of the crank or handle 36 extending downwardly through the top of said body. In addition, the cutting of but a limited number of teeth in the disk 37 makes a stop in each direction to the amount that the signal can be turned, sufficient turning of the signal being provided, however, that the shaft 5 may be turned through so that the arm 12 may be moved to its four positions, the same as heretofore described.

This signal is designed to be painted a striking color so as to be very noticeable in daylight, and the lights give clear indications at night, the green light through openings 15 in conjunction with a red light through the tube 16 indicating the direction and position of the arm 12 for any of its three positions other than straight ahead position. This signal is easily operated, readily installed, is not particularly noticeable except when it is moved into position to indicate a change in direction or slowing or stopping of the vehicle on which it is attached, is relatively economical to manufacture, and is practical and serviceable in all respects. The appended claims define the invention and it is to be considered that all modifications in construction coming within the scope of said claims are comprehended by the invention.

I claim:

1. In a device of the class described, in combination with the body of a motor vehicle, a signal member attached thereto, said signal comprising two tubular parts located at an obtuse angle to each other, means for manually rotating said signal whereby the same may be moved to a plurality of different positions, in one of which one of the parts of the signal member lies substantially parallel and alongside of the vehicle, in another extends upwardly and outwardly at an angle thereto, in another downwardly and outwardly at an angle thereto, and in still another outwardly and forwardly at an angle thereto, substantially as described.

2. In a device of the class described, the combination of a support adapted to be attached to a motor vehicle body and including a horizontal sleeve, a shaft rotatably mounted in said sleeve and passing therethrough, said shaft at one end having a portion turned at an obtuse angle to the remainder of the shaft, and an arm attached to said shaft and extending outwardly in alinement with said angularly turned portion of the shaft, substantially as described.

3. In combination, a support adapted to be attached to a top of a motor vehicle body, a signal member rotatably mounted on said support, means for manually rotating said signal member, said member comprising an outer elongated arm and a shorter inner sleeve located at an obtuse angle to the arm, said shorter inner sleeve being located at an acute angle to the length of the vehicle body, substantially as described.

4. In combination, a signal member comprising an elongated outer arm, a shorter inner member attached to said arm and positioned at an obtuse angle thereto, means for rotatably supporting the signal member adjacent the inner end of said shorter member, and means for turning the same about the longitudinal axis of the shorter inner member.

5. In combination, a support, a sleeve extending therethrough, a shaft passing through the sleeve and at its outer end having a portion turned at an angle to the remainder of the shaft, a disk attached to the outer end of the shaft, a tubular arm passed over the disk at one end and connected thereto, a sleeve rotatably mounted on the shaft in alinement with the first sleeve, a hollow cylindrical member having a cross-section substantially equal to the cross section of the arm carried by said rotatably mounted sleeve and movable therewith, said cylindrical member and arm having ends coming together, and means for turning the shaft, substantially as described.

6. In combination, the elements in combination defined in claim 5, combined with lights carried in said tubular arm at spaced apart distances and visible through openings in the arm, substantially as described.

7. In combination, the elements in combination defined in claim 5, combined with a transparent colored tube secured at the outer end of the arm, and a similar tube located in the arm adjacent its inner end, said arm having openings through its sides where said last tube is located, and lights located within the arm inside of said tubes, substantially as described.

8. In a device of the class described, a combination with the body of a motor vehicle, a signal member attached thereto, said signal member comprising an inner shorter part having an end thereof located adjacent the body and an outer longer part located at an obtuse angle to the inner part, and means for manually rotating said signal member whereby the same may be moved to a plurality of different positions about a horizontal axis, substantially as described.

In testimony whereof I affix my signature.

HENRY C. HACHMUTH.